United States Patent [19]

Schreyer et al.

[11] 4,250,353

[45] Feb. 10, 1981

[54] DANGER ALARM SYSTEM

[75] Inventors: Karlheinz Schreyer, Wolfratshausen; Karla Oberstein, Neuried, both of Fed. Rep. of Germany

[73] Assignee: Siemens Aktiengesellschaft, Berlin & Munich, Fed. Rep. of Germany

[21] Appl. No.: 29,834

[22] Filed: Apr. 13, 1979

[30] Foreign Application Priority Data

Apr. 19, 1978 [DE] Fed. Rep. of Germany ....... 2817090

[51] Int. Cl.[3] ........................................ H04M 11/04

[52] U.S. Cl. ................................................ 179/5 R

[58] Field of Search ...................... 179/5 R, 5 P, 2 A; 340/506, 517, 518, 521

[56] References Cited

U.S. PATENT DOCUMENTS 3,842,208 10/1974 Paraskevakos ...................... 179/5 R

*Primary Examiner*—Bernard Konick
*Assistant Examiner*—Joseph A. Popek
*Attorney, Agent, or Firm*—Hill, Van Santen, Steadman, Chiara & Simpson

[57] ABSTRACT

A danger alarm system has a plurality of call lines and a plurality of alarm circuits respectively connectible to the call lines and operable to provide signals indicative of environmental conditions about the alarm circuits. A central exchange is connected to the call lines and includes a write-read memory and means connected thereto for inputting the busy condition of each of the lines. A multiplexer is connected between the lines and the memory for sequentially interrogating the memory and the lines. Evaluation circuits are provided and operated upon comparison of the call line signals and the corresponding memory locations.

10 Claims, 1 Drawing Figure

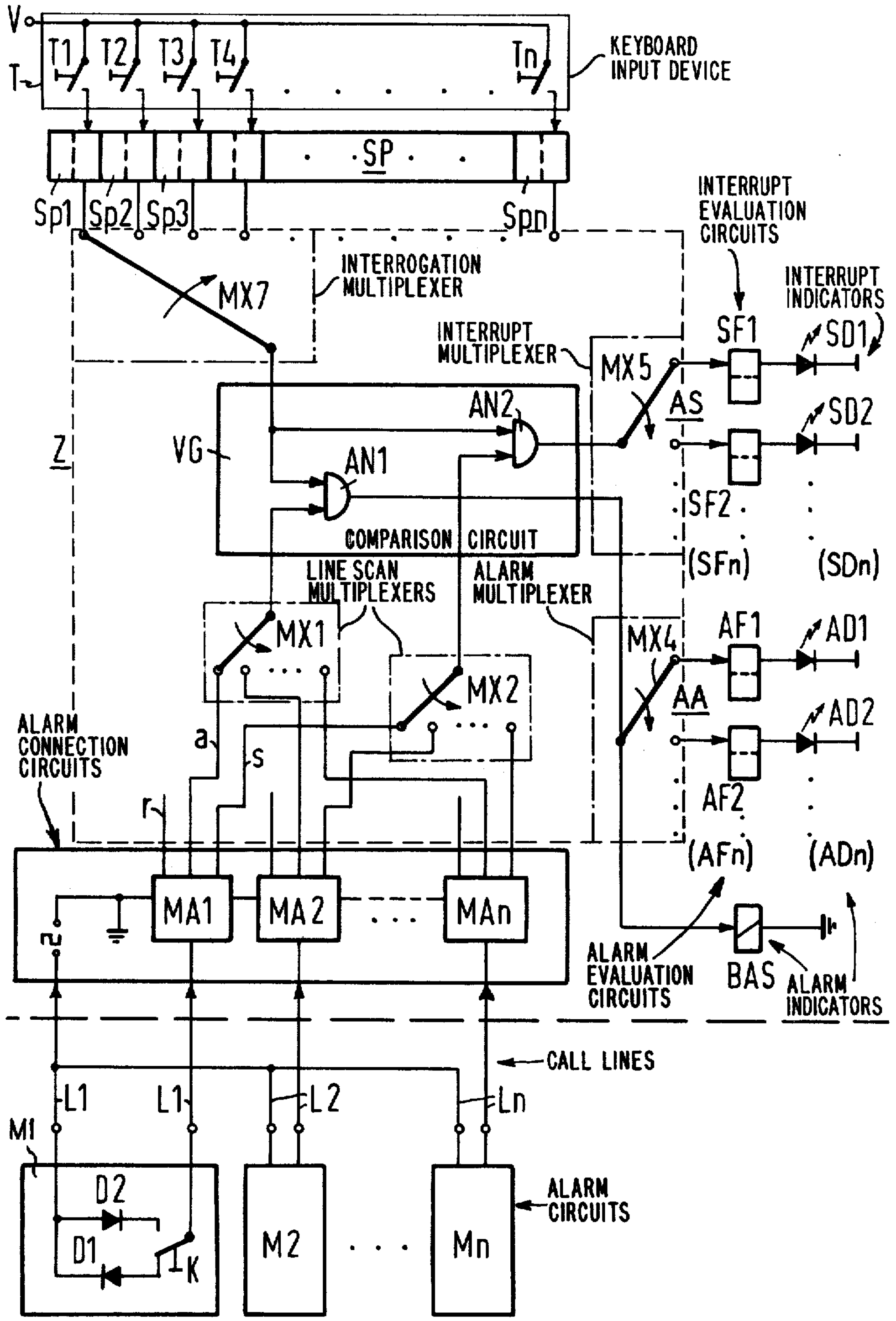
V
T
T1
T2
T3
T4
Tn
KEYBOARD INPUT DEVICE
SP
Sp1
Sp2
Sp3
Spn
INTERRUPT EVALUATION CIRCUITS
INTERROGATION MULTIPLEXER
MX7
INTERRUPT INDICATORS
INTERRUPT MULTIPLEXER
MX5
SF1
SD1
SD2
AN2
AS
VG
AN1
Z
SF2
COMPARISON CIRCUIT
(SFn)
(SDn)
LINE SCAN MULTIPLEXERS
ALARM MULTIPLEXER
MX1
MX2
MX4
AF1
AD1
AA
AD2
AF2
ALARM CONNECTION CIRCUITS
a
s
r
(AFn)
(ADn)
MA1
MA2
MAn
ALARM EVALUATION CIRCUITS
BAS
ALARM INDICATORS
CALL LINES
L1
L2
Ln
M1
D2
D1
K
M2
Mn
ALARM CIRCUITS

DANGER ALARM SYSTEM

CROSS REFERENCE TO RELATED APPLICATION

This application is related to an application, Ser. No. 029,831 filed Apr. 13, 1979 of Karlheinz Schreyer et al and to an application, Ser. No. 029,388, filed Apr. 12, 1979 Otto Walter Moser et al.

BACKGROUND OF THE INVENTION

1. Field of the Invention

The present invention relates to a danger alarm system having a plurality of alarm circuits which are connected via call lines to a central exchange, and more particularly to such a system in which the state of the alarm circuits can be determined in the central exchange by way of testing apparatus and can be displayed by way of evaluation circuits.

2. Description of the Prior Art

Such alarm systems are known, for example, as public fire alarm systems. In general, these systems are modularly designed so that a plurality of lines are usually connectible to the connection component groups in the central exchange. It is therefor required to allocate the correct indications to the alarm circuits which are actually connected and to take care that lines which are not connected do not effect interrupt displays.

This is done in conventional systems, for example, in that a functional interface is simulated at lines which are not connected, for example by means of a specific termination element. However, it is also possible to sort the relaying of the alarm by means of special lines and, in case the same is required, to prevent such relaying by means of interrupting the line. In conventional systems, in such cases, a manual operation must be undertaken in the wiring of the system. This requires a substantial amount of time for screwing and soldering connections; moreover, there is always the danger in such operations that lines are mistaken and incorrectly connected.

SUMMARY OF THE INVENTION

The object of the present invention is to provide a danger alarm system of the type generally mentioned about in which such changes in wiring are not required. In a simple manner, the system is to guarantee a constant monitoring of the alarm configuration, whereby each change in loading can be quickly and easily taken into consideration in the central exchange and in the evaluation operation.

The above object is achieved, according to the present invention, in that a write-read memory is provided in the central exchange, in which the seizure of each individual call line can be fed in by way of an input device. A multiplex interrogation unit it provided with which the individual call lines and the memory locations allocated to the call lines in the write-read memory can be synchronously interrogated. The alarm signals interrogated from the call lines are fed, via a comparator, together with the interrogated memory signals and are only further relayable to the evaluation circuit when the appertaining memory location indicates seizure of the respective call line.

The write-read memory, therefore, contains the entire system configuration corresponding to the busy condition of the individual call lines. The individual memory locations are inscribed by way of an input element, for example a keyboard. Security is provided, by means of the comparator, that incoming reports are compared with the fed in elements and that interrupt reports or alarm reports are only further relayed when the line concerned is busy, when thus, the alarm is entered in the memory location concerned as being present. A microcomputer can preferably be employed as the comparator.

BRIEF DESCRIPTION OF THE DRAWING

Other objects, features and advantages of the invention, its organization, construction and opertion will be best understood from the following detailed description, taken in conjunction with the accompanying drawing, on which there is a single FIGURE. showing, in schematic form, a danger alarm system constructed in accordance with the present invention.

DESCRIPTION OF THE PREFERRED EMBODIMENTS

Referring to the drawing, a circuit diagram for a danger alarm system is illustrated as comprising a central exchange Z from which the plurality of individual call lines L1...Ln extend to respective alarm circuits M1...Mn. The call lines are connected to respective alarm connection circuits MA1...MAn in the central exchange in which the signals received from the respective alarm circuits are tested or evaluated to determine the environmental state surrounding the alarm circuits. Depending on the state, a signal r is determined for the quiescent state, a signal a for an alarm state or a signal s for an interrupt state, appears at the ouputs of an alarm connection circuit.

When, for example, one assumes the employment of diode alarms as illustrated in the alarm circuit M1, these report signals are produced in the following manner:

(1) An alternating current or a direct current having changing polarity is delivered from the alarm connection circuit MA1 to the call line L1 and as long as the alarm switch K is in the quiescent state, as shown on the drawing, one half-wave of the current flows via the diode D1 and produces the quiescent signals r in the alarm in the alarm connection MA1;

(2) When the alarm switch K is operated to the other position, the other half-wave of the current flows by way of the diode D2 and produces the alarm a and the alarm connection circuit;

(3) Upon line interruption, no current can flow by way of the alarm circuit M1 and this lack of current is interpreted as an interrupt signal s.

The interrupt signal s is also generated when both half-waves can be received by means of a line short circuit. When no alarm circuit is connected to the line, this would likewise be reported as an interrupt signal if corresponding precautionary measures were not undertaken in the central exchange.

In the central exchange, the individual alarm connection circuits MA1...MAn are cyclically interrogated by way of a multiplexer (illustrated as the rotary selector) MX1 and MX2 and, in particular, the outputs a for the alarm signal via the interrogation of multiplexer MX1 and the outputs s for the interrupt signals by way of interrogation mulitplexer MX2 are reported. In general, an interrogation installation does not is not required for the quiescent signal r, since the quiescent state need not be specifically displayed. As soon as an alarm or interrupt signal appears at an alarm connection circuit, the same is supplied to an alarm evaluation circuit AA or to an interrupt evaluation circuit AS by way of a comparator VG.

However, in order to only evaluate reports when the line concerned is actually connected via an alarm connection circuit, a write-read memory SP is provided in the central exchange, in whose individual memory locations Sp1...Spn the busy state of each call line L1...Ln is stored. Upon placing the system in operation, a busy state is input into each memory location by way of an input device, such as a keyboard T, when an alarm circuit is connected to the appertaining line. If, therefore, the alarm circuit M1 is connected, then the contact T1 is closed and a logical "1" appears at the output of the memory location Sp1. The memory outputs are interrogated in synchronism with the alarm connection circuits by means of an interrogation multiplexer MX7; the interrogated signal is likewise supplied to the comparator VG. The alarm signal a and the interrupt signal s are only relayed by way of the comparator VG to the evaluation circuits AA and AS via coincidence elements AN1 and AN2 when the memory location concerned is determined as busy. Of course, the functions of the comparatorand the multiplexers can be carried out by a microcomputer having corresponding programming and with an allocated write-read memory.

The alarm evaluation circuit AA and the interrupt evaluation circuit AS, contained output multiplexers MX4 and MX5, also operating in synchronism with the other multiplexers, by way of which an alarm signal a or an interrupt signal s of a specified call line is employed in a display installation for switching on the respective appertaining light-emitting diode AD1...ADn or, respectively, SD1...SDn. In order to stabilize the display, a flip-flop AF1...AFn or, respectively, SF1...SFn is respectively allocated to each light-emitting diode. In addition, the alarm signal a is supplied to a bistable alarm switch BAS which emits an acoustic alarm in the usual manner, or relays an alarm report to a superordinate exchange.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly by included within the scope of our contribution to the art.

We claim:

1. A danger alarm system comprising:
a plurality of call lines for calling signals;
a plurality of alarm circuits connected to respective call lines and operable to provide environment condition signals to said lines; and
a central exchange connected to said call lines, said central exchange including
a plurality of alarm connection circuits connected to respective call lines and each having three outputs and each operable to provide signals including alarm and line interrupt signals in response to the environmental signals,
a write-read memory including a plurality of storage locations each including an input and an output and each assigned to store the busy or non-busy state of a respective line,
a plurality of synchronously operable multiplexers, first and second ones of said multiplexers connected to read said first and second outputs, respectively, of said plurality of alarm connection circuits,
a third one of said mulitiplexers connected as an interrogation multiplexer to said outputs of said memory,
a comparison circuit connected between said third, interrogation multiplexer and said first and second multiplexers and operable to compare alarm and interrupt signals with the busy status of the respective call lines and responsive to a busy state in conjunction with an alarm signal to produce an alarm output signal and responsive to a busy state in conjunction with an interrupt signal to produce an interrupt output signal,
alarm evaluation circuits operable in response to alarm output signals,
interrupt evaluation circuits operable in response to interrupt output signals,
a fourth multiplexer connected as an alarm multiplexer between said comparison circuit and said alarm evaluation circuits, and
a fifth multiplexer connected as an interrupt multiplexer between said comparison circuit and said interrupt evaluation circuits.

2. The danger alarm system of claim 1, wherein said comparison circuit comprises
a first AND gate connected between said third, interrogation multiplexer for receiving line state signals and connected to said first multiplexer for receiving alarm signals; and
a second AND gate connected to said third, interrogation multiplexer for receiving line state signals and connected to said second multiplexer for receiving interrupt signals.

3. The danger alarm system of claim 1, comprising:
an input device including a keyboard connected to said inputs of said memory for inputting busy state data of said call lines.

4. The danger alarm system of claim 1, wherein said fourth, alarm multiplexer comprises: a plurality of outputs connected to said alarm evaluation circuits, each of said outputs including a bistable device for transmitting alarm output signals.

5. The danger alarm system of claim 4, comprising:
a plurality of alarm indicators, each of said alarm indicators connected to a respective alarm evaluation circuit.

6. The danger alarm system of claim 5, wherein said alarm indicators comprise light-emitting diodes.

7. The danger alarm system of claim 1, wherein said fifth, interrupt multiplexer comprises:
a plurality of outputs connected to said interrupt evaluation circuits, each of said outputs including a bistable device for transmitting interrupt output signals.

8. The danger alarm system of claim 7, comprising:
a plurality of interrupt indicators, each of said indicators connected to a respective interrupt evaluation circuit.

9. The danger alarm system of claim 8, wherein said interrupt indicators comprise light-emitting diodes.

10. The danger alarm system of claim 1, wherein said synchronously operable multiplexers and said comparison circuit are constituted by a microcomputer.

* * * * *